(12) United States Patent
Kenney (10) Patent No.: US 9,794,787 B2
(45) Date of Patent: Oct. 17, 2017

(54) SYSTEM AND METHOD FOR LIMITING MOBILE DEVICE FUNCTIONALITY

(71) Applicant: Core Wireless Licensing, S.a.r.l., Luxembourg (LU)

(72) Inventor: Thomas J. Kenney, Portland, OR (US)

(73) Assignee: Conversant Wireless Licensing S.A R.L., Luxembourg (LU)

(*) Notice: Subject to any disclaimer, the term of this patent is extended or adjusted under 35 U.S.C. 154(b) by 0 days.

(21) Appl. No.: 14/642,264

(22) Filed: Mar. 9, 2015

(65) Prior Publication Data

US 2015/0181434 A1    Jun. 25, 2015

Related U.S. Application Data

(63) Continuation of application No. 10/597,862, filed as application No. PCT/IB2005/000333 on Feb. 9, 2005, now Pat. No. 8,995,958, which is a continuation of application No. 10/783,617, filed on Feb. 20, 2004, now abandoned.

(51) Int. Cl.

| | |
|---|---|
| *H04M 1/66* | (2006.01) |
| *H04W 12/08* | (2009.01) |
| *H04M 1/67* | (2006.01) |
| *H04W 8/22* | (2009.01) |
| *H04M 1/725* | (2006.01) |

(52) U.S. Cl.
CPC ............ *H04W 12/08* (2013.01); *H04M 1/67* (2013.01); *H04M 1/72577* (2013.01); *H04W 8/22* (2013.01)

(58) Field of Classification Search
CPC ...... H04M 1/66; H04M 1/67; H04M 1/72577; H04W 8/22; H04W 12/08
USPC .............................. 455/411, 410, 419, 456.2
See application file for complete search history.

(56) References Cited

U.S. PATENT DOCUMENTS

| | | | | |
|---|---|---|---|---|
| 5,734,978 | A * | 3/1998 | Hayatake .............. | H04W 12/12 455/410 |
| 6,166,652 | A * | 12/2000 | Benvenuti ............ | G08B 3/1083 340/539.32 |
| 6,813,487 | B1 * | 11/2004 | Trommelen .......... | H04W 88/02 340/568.1 |
| 7,103,367 | B2 * | 9/2006 | Adams .............. | H04M 1/72522 455/419 |

(Continued)

*Primary Examiner* — Barry Taylor
(74) *Attorney, Agent, or Firm* — Core Wireless Licensing Ltd.

(57) ABSTRACT

The present invention relates to systems and methods that employ various mechanisms to selectively disable mobile device functionality. In general, mobile devices can be utilized to store personal and/or highly sensitive information such as bank account numbers, social security numbers, credit card numbers and the like. If the mobile device is lost or stolen, data stored within the device can be accessed by an unauthorized user; and, thus, any personal and/or highly sensitive information can be obtained. In order to mitigate unauthorized access, the subject invention provides a disabling component that communicates with the lost or stolen device to render data stored thereon inaccessible. Further, the data can be stored in local or remote locations to backup stored information, thereby creating a more robust and reliable method of storing information important to the device owner. These features provide enhancements over conventional mobile device security techniques.

15 Claims, 10 Drawing Sheets

(56) References Cited

U.S. PATENT DOCUMENTS

| | | | | |
|---|---|---|---|---|
| 8,995,958 B2* | 3/2015 | Kenney | ................... | 455/411 |
| 2003/0065934 A1* | 4/2003 | Angelo | ................... | H04L 63/12 |
| | | | | 726/35 |
| 2004/0137893 A1* | 7/2004 | Muthuswamy | ....... | H04W 12/12 |
| | | | | 455/419 |
| 2004/0203941 A1* | 10/2004 | Kaplan | ................ | H04W 8/245 |
| | | | | 455/466 |

* cited by examiner

SYSTEM AND METHOD FOR LIMITING MOBILE DEVICE FUNCTIONALITY

CROSS REFERENCE TO RELATED APPLICATIONS

This patent application is a continuation application of US Publication No. 20080233919 published on Sep. 25, 2008 (U.S. patent application Ser. No. 10/597,862 filed on Apr. 28, 2008) which is a 371 application of International Published Application No. WO 2005084052 published on Sep. 9, 2005 (International Application No. PCT/IB2005/000333 filed on Feb. 9, 2005) which is a continuation application of US Publication No. 20050186954 published on Aug. 25, 2005 (U.S. patent application Ser. No. 10/783,617 filed on Feb. 20, 2004), the subject matter of which is hereby incorporated by reference.

TECHNICAL FIELD

The present invention generally relates to mobile devices, and more particularly to systems and methods that employ various mechanisms that selectively disable mobile device functionality to prohibit unauthorized access to information stored within mobile device memory.

BACKGROUND OF THE INVENTION

In today's world, the use of mobile devices (e.g., cellular phones, personal digital assistants, handheld PCs, etc.) has become a standard form of maintaining communication with others as well as a means to store data important to the user. The information stored on such devices can relate to personal or business data such as social security numbers, phone numbers, addresses, bank account numbers, credit card numbers, etc. Due to technological advances in memory storage capabilities proportional to memory size, a mobile device is capable of storing large amounts of information.

Thus, the information contained in an individual's mobile device can be extremely user specific and as a result contain highly sensitive information related to the device owner. As a consequence, an unscrupulous user who finds a lost or misplaced mobile device can misuse the information stored therein. For example, a mobile device can contain information that is user-specific but not readily usable unless such data can be correlated with other information. Such data can be tied to the original user providing an easy means for the unscrupulous user to commit identity theft, which can result in loss of money, ability to obtain credit and other damaging affects to a device owner. Such a misuse of information can be a major inconvenience to the device owner and thus is undesirable.

By the nature of their design, mobile devices have several properties making them more vulnerable to loss. They are compact and can be carried everywhere by the user to provide instant access to the information contained within the device. Since the information in the devices can be highly sensitive, there exists a danger that someone who acquires the lost device will have access to all the information contained within. In the hands of an unscrupulous user, this information can be misused to facilitate identity theft. Such a misrepresentation can allow the unscrupulous user to obtain credit cards and other resources and to employ such resources to the detriment of the mobile device owner.

Additionally, user specific information can be contained on the device to allow personal data to be correlated to other stored information such as social security numbers, bank account numbers, addresses and the like. Correlating such data can help an unscrupulous user create a fictional identity as though they are the original user. In view of the technology available today, financial transactions do not require a high level of security between a debtor and creditor. In fact, little more than a person's name, billing address and social security number is required to correlate to a credit card number in order to purchase goods in today's technology rich commerce. Thus, by simply accessing some personal data related to the device owner, the unscrupulous user can assume the device owner's identity and inflict financial hardship or other deleterious consequences to the device owner's personal life.

One conventional method currently employed to provide a security means is to password protect access to the mobile device. Such a measure requires the password protection to be invoked to prevent access to any of the device's functionality. In order to gain such access, a password must be entered to allow the user to utilize the device's functionality. However, such protection can be insufficient for a number of reasons such as forgetting to invoke the protection, simply entering an easily decipherable password (e.g., 123) to overcome the protection or simply not invoking such protection because it creates an inconvenience for the user.

As noted above, the mobile device provides a convenient means to allow a device owner to structure their life. However, such a device will most likely be small to provide convenient mobility and thus, easily lost or forgotten. Since the mobile device is subject to a high degree of being lost or misplaced, and such a device may contain highly sensitive information, there exists a need to have a method or system to protect such information from access by an unscrupulous user. In addition, it is desirable to have such a protection mechanism be easily invoked to provide a fast and convenient means to protect sensitive data.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods utilized to prevent unauthorized access to information stored in a mobile device such as a cellular phone, personal data assistant or handheld computer, for example. Such stored data can contain personal and/or highly sensitive data such as social security numbers, bank account numbers, credit card numbers, phone numbers, addresses and the like. The mobile device can employ a plurality of techniques to disable the functionality of the device and thus, prevent access to the device memory to mitigate any damage (e.g., financial) suffered as a result of identity theft or related criminal acts.

In one aspect of the present invention, the mobile device memory is disabled via a signal transmitted from a network employed to provide wireless communication to the device. The signal can be transmitted after the network operator has been notified. Such signal can be sent one time, on a continuous basis or on a user defined periodic basis, for example. In addition, a signal can be sent from the device to the network to provide confirmation that the device memory has been disabled.

In another aspect of the current invention, the signal can be utilized to trigger preexisting security features contained in the mobile device. Such features can include disabling the keypad, blanking out the screen display and/or sounding an audio alarm to indicate a theft has occurred.

In yet another aspect of the current invention, an audio signal can be triggered to notify the device owner of the location of the device. Such a feature can be employed when the owner believes the device has been misplaced and wishes to locate such a device. Such a signal can be activated via the Internet or telephone call to the network operator, for example. The owner can activate the signal immediately after losing/misplacing the device to locate the device itself or locate the device and the person currently in possession of the device. Such an audio signal can be used to signal strangers (e.g. persons who have no knowledge of the theft) and/or law enforcement personnel to apprehend the party currently in possession of the device.

In yet another aspect of the current invention, the device can employ a tracking device, such as a global positioning system or homing beacon to track and locate the lost/misplaced mobile device. In this embodiment, the mobile device can be tracked located to facilitate recovery of the lost data and to provide criminal ramifications for the possessor of the lost device.

In still yet another aspect of the current invention, sending a pre-determined code via the wireless network can disable the device memory. For example, if the mobile device is a cellular phone, the memory security can be invoked via the caller ID of the phone as it displays the source (e.g., pre-set phone number) of the incoming call. Alternatively or additionally, an alphanumeric message (e.g., text message) can be sent to the device via the wireless network to invoke the memory disabling security feature.

In yet another aspect of the current invention, device memory access can be disabled after a first attempted use by the current user after the network operator has been notified. The memory disabling feature can be invoked by placing a phone call, sending and email or any other attempt at utilizing the lost/misplaced mobile device. The feature can also be invoked via the use of other features of the device that do not relate to outside communication such as a planning/calendar function, calculator, phone book, address book and the like.

In another aspect of the present invention, a third-party signal outside the wireless network can be utilized to invoke the memory-disabling feature. Such an embodiment can be employed when the mobile device is outside the reach of the wireless network, and yet still is open to unauthorized data access by the current user. Such a network can be implemented via a satellite network or some other equivalent that can maintain constant communication with the mobile device regardless of location.

In another aspect of the current invention, data from the mobile device can be uploaded via the network and sent to a desired location for subsequent retrieval by the mobile device owner. This particular embodiment is utilized to go beyond simply preventing others from accessing personal and/or sensitive information. This feature can be employed to retrieve data from the device that is difficult to reconstruct such as for example, individual cell phone numbers (which cannot be looked up via directory), addresses and the like. Such uploaded data can be accessed via the Internet, an operator location or stored in a remote location, for example.

In yet another aspect of the present invention, the data stored on the mobile device can be erased from the device memory completely. This embodiment can be employed after the data as been uploaded from the device memory if desired. Memory erasure can be invoked utilizing at least one of the aforementioned methods and/or systems.

In still yet another aspect of the current invention, at least a portion of the data the device owner wishes to store can be stored remotely. Such data can be stored remotely based on the importance and/or sensitivity to the owner of the device. In this embodiment, the device owner can utilize a user name and/or password to access data stored remotely on the wireless network employed with the mobile device. Thus, the data can be retrieved and access can be denied any unauthorized user as soon as the network operator is notified.

To the accomplishment of the foregoing and related ends, certain illustrative aspects of the invention are described herein in connection with the following description and the annexed drawings. These aspects are indicative, however, of but a few of the various ways in which the principles of the invention may be employed, and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention relates to systems and methods that selectively disable mobile device (e.g., cell phone, PDA, handheld PC, laptop computer, etc.) functionality to prohibit access to portions of information stored therein and/or in connection therewith. Such information can be user specific, for example, highly sensitive and/or personal data such as bank account numbers, social security numbers, credit card numbers, addresses and the like. Thus, the present invention can disable access to the device to prevent unauthorized access to data stored in device memory. It is to be appreciated that the present invention can be employed in relation to any number of systems and/or environments to inhibit the functionality as desired by the user. In addition, the subject invention can limit the functionality of such a system in a plurality of ways including disabling the display, disabling any peripheral input devices to the target system and disabling specific functionality (e.g., access to the target device memory), for example.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Figure 1:
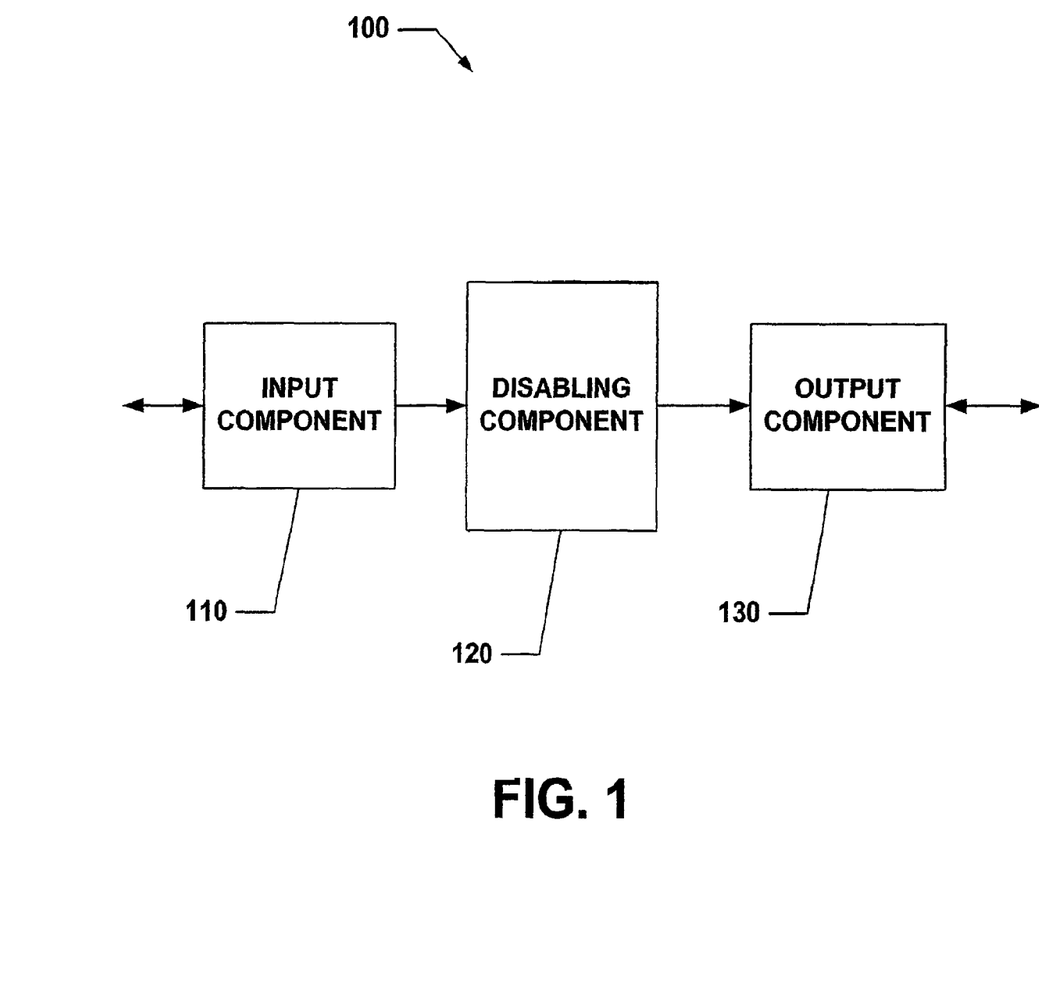
FIG. 1 illustrates an exemplary disabling component system, in accordance with an aspect of the present invention.

FIG. 1 illustrates an exemplary system 100 that can disable and/or limit functionality of a target device employed in conjunction with the subject invention. The system 100 comprises an input component 110 (e.g., mobile device antenna) that receives and conveys a notification signal to a disabling component 120. The signal can be employed to initiate disabling and/or limiting the functionality of a target system (e.g., mobile device) via a control signal sent to an output component 130. This control signal can be employed to limit functionality of the target device to prohibit unauthorized access to data stored locally in memory, for example.

The signal initially sent to the input component 110 can be generated in a multitude of different manners such as a signal, message or bit. In one embodiment, the input component can accept a message from an outside source to trigger the disabling component to begin operation. For example, if the target device is a cellular phone, a call from a pre-defined number can be placed to and the caller ID can be employed to trigger the disabling component. Thus, if the phone is lost and subsequently found by an unscrupulous user, the memory of the device can be protected by way of a simple phone call.

In another example, the target device can be a personal digital assistant (PDA) associated with a wireless network service. An email message can be sent to the device to instantiate the disabling component 120 to prevent access to any data contained in the PDA's memory. As discussed below, the output component 130 can interface to a plurality of devices such as laptop computers, handheld PCs, notebook PCs, PDAs, cellular phones and the like.

The input component 110 can receive information from wireless networks, keypad entries, pre-defined user inputs, etc. Such inputs can be originated by the original user of the target device or the wireless network operator, contain any amount of information and be represented in various formats such as an ASCII string, one or more bits or a signal.

The disabling component 120 can be a microprocessor, a switch, a relay and so on. In other words, the unit can trigger the limitation of the target device by simply disabling some access to I/O of a microprocessor, for example. Further, the disabling component can be executable code employed in the operating software of a target device (e.g., palm software in a PDA, proprietary software in a cell phone, Windows software in a handheld PC, etc.). In this manner, the software can be written to execute the disabling component 120 when a specific input is accepted by the input component 110.

It is to be appreciated that the input component 110 is coupled to the disabling component 120 and can interface with the disabling component 120 in a plurality of ways. For example, the disabling component 120 can reside in a notebook computer which is connected to a wireless network. In this example, the input component 110 can be located at the network operator's control center and communicate to the disabling component 120 via the wireless network.

The output component 130 can take a plurality of forms as dictated by the location and form of the disabling component 120. For example, the output component 130 can simply take the form of an output in a microprocessor wherein the disabling component 120 is executable software. In another example, the output component 130 can be a signal sent from a cellular network to a phone connected to such a network. Once the disabling signal is sent to the phone (e.g., target device), the functionality of the phone will be limited.

Figure 2:
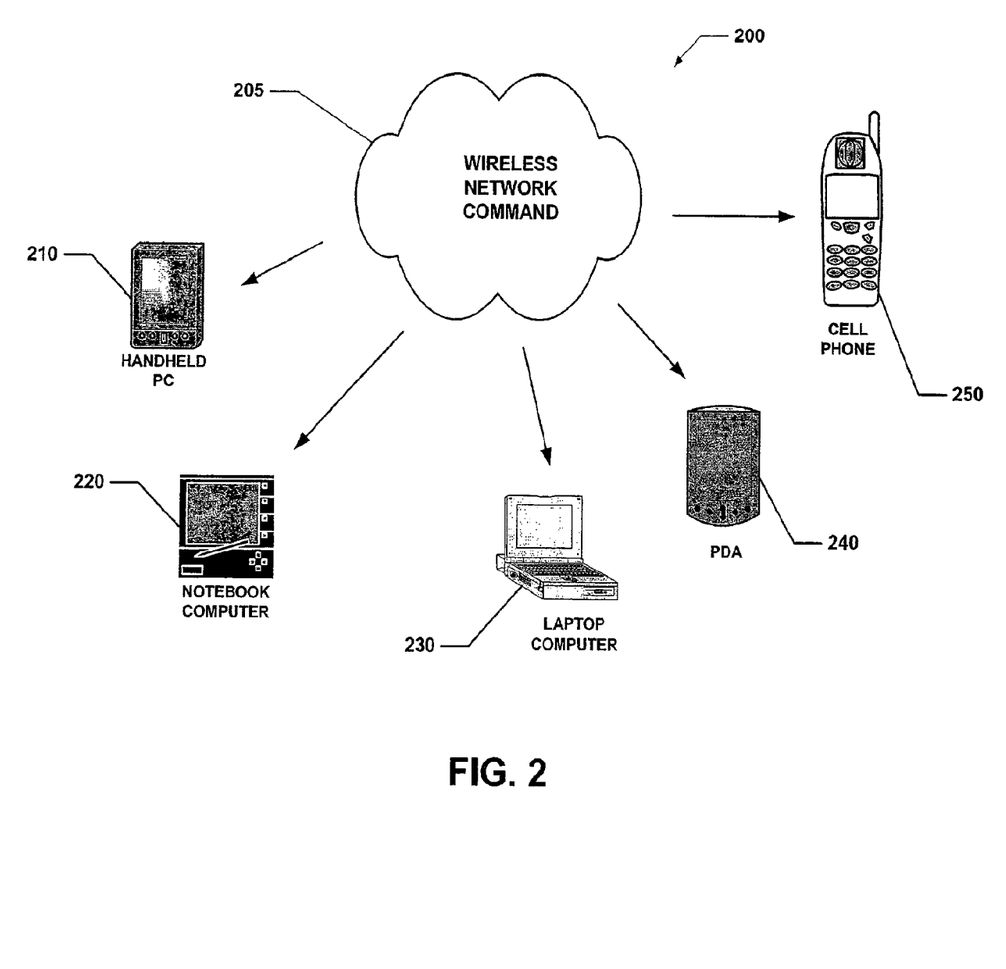
FIG. 2 illustrates various exemplary systems utilized in accordance with the present invention.

FIG. 2 illustrates an exemplary system 200 that shows a plurality of disparate target devices can be employed in conjunction with the present invention wherein communication is facilitated with the target devices via a wireless network command 205. Such target devices include a handheld PC 210, notebook computer 220, laptop computer 230, PDA 240 and cell phone 250.

The target devices receive a signal from the wireless network command 205 to disable the memory and/or limit the functionality of the device. The signal sent to the device can carry the disabling command or simply trigger such a disabling command locally at the target device, for example. Such a local command could activate a security feature inherent in the device. For example, a voice lock feature can be activated utilizing the disabling signal sent from the wireless network command 205.

It is to be appreciated that although the devices are shown receiving the command via wireless network, such a command can be sent in any desired manner. For example, the device could be connected to a land based network (e.g., LAN, WAN, etc) and such a connection can be made utilizing a physical connection (e.g., Ethernet cable, serial cable, parallel cable, USB cable, etc).

Figure 3:
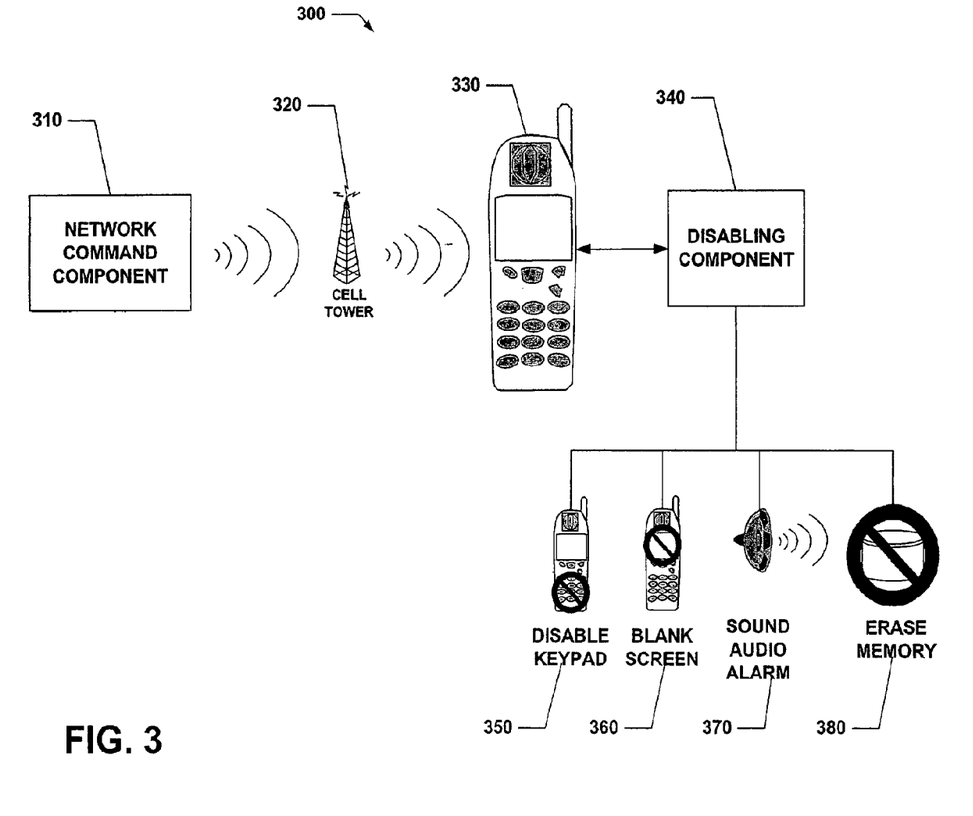
FIG. 3 illustrates an exemplary network command system, in accordance with an aspect of the present invention.

FIG. 3 illustrates an exemplary system 300 that conveys a signal from a network command component 310 via a cell tower 320 to a cellular phone 330. The cellular phone 330 is coupled to a disabling component 340, which can limit the functionality of such a mobile device and thus, prevent an unauthorized user from accessing the memory of the device or perform unauthorized actions. The signal sent from the network command component 310 can be in the form of a caller ID which is pre-set to disable the phone as soon as the call is made and received. In another aspect of the present invention, the command can be part of the signaling protocol (e.g., IS2000, CDMA, GSM, WCDMA, etc.) employed by the mobile device to facilitate wireless communication.

Several aspects of current invention are shown that selectively limit the functionality of the cell phone. Each method shown can be selected by the user or alternatively, a desired default setting can be chosen by the user. It is to be appreciated the disabling examples given are in no way exhaustive and that a broad range of methods can be employed, including intelligence based techniques.

In this particular embodiment, the disabling component 340 is associated with four disabling systems that limit the functionality of the cellular phone 330. The methods shown represent both intrusive and non-intrusive alternatives in accordance with the subject invention. In accordance with the subject invention, an intrusive method is one that renders the device memory permanently inaccessible such as by deletion of such memory, for example. A non-intrusive technique does not permanently disable device functionality and is typically associated with a device's own security features (e.g., keypad lock, voice lock, etc).

The disabling systems shown are disable keypad 350, blank screen 360, sound audio alarm 370 and erase memory 380. The disable keypad command 350 is non-intrusive and prevents the unauthorized user from inputting commands to the mobile device 330 and thus, accessing data stored in the device. Utilizing the blank screen command 360 is similarly non-intrusive and limits functionality of the phone by inhibiting the display of command options available to the user. An alternative command is to sound an audio alarm 370 to deter an unauthorized user from accessing data and/or allowing the original device owner to easily determine the location of the device 330. An invasive alternative to the above-described commands is to erase memory 380 of the device 330, which prohibits data access by substantially all users. It is to be appreciated that the above-described embodiment can be employed in relation to substantially any mobile device as noted above.

Figure 4:
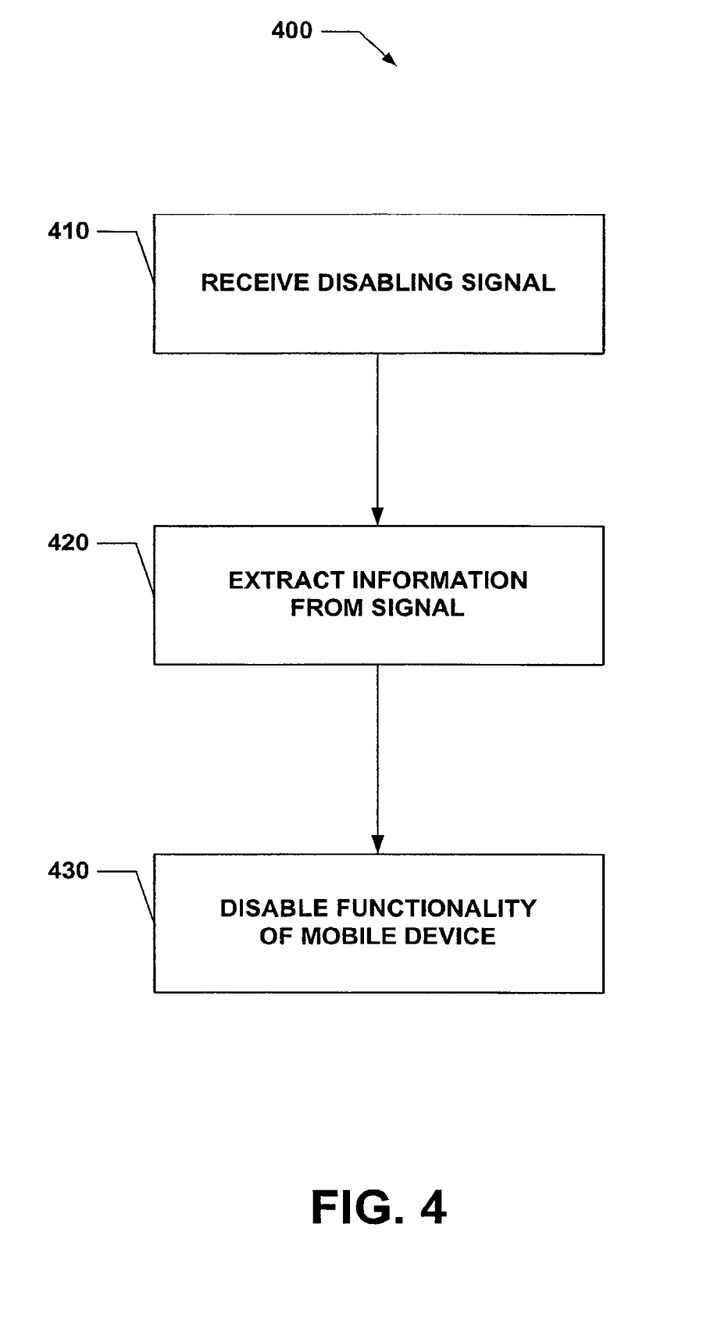
FIG. 4 illustrates an exemplary methodology that disables the functionality of a mobile device, in accordance with an aspect of the present invention.
Figure 5:
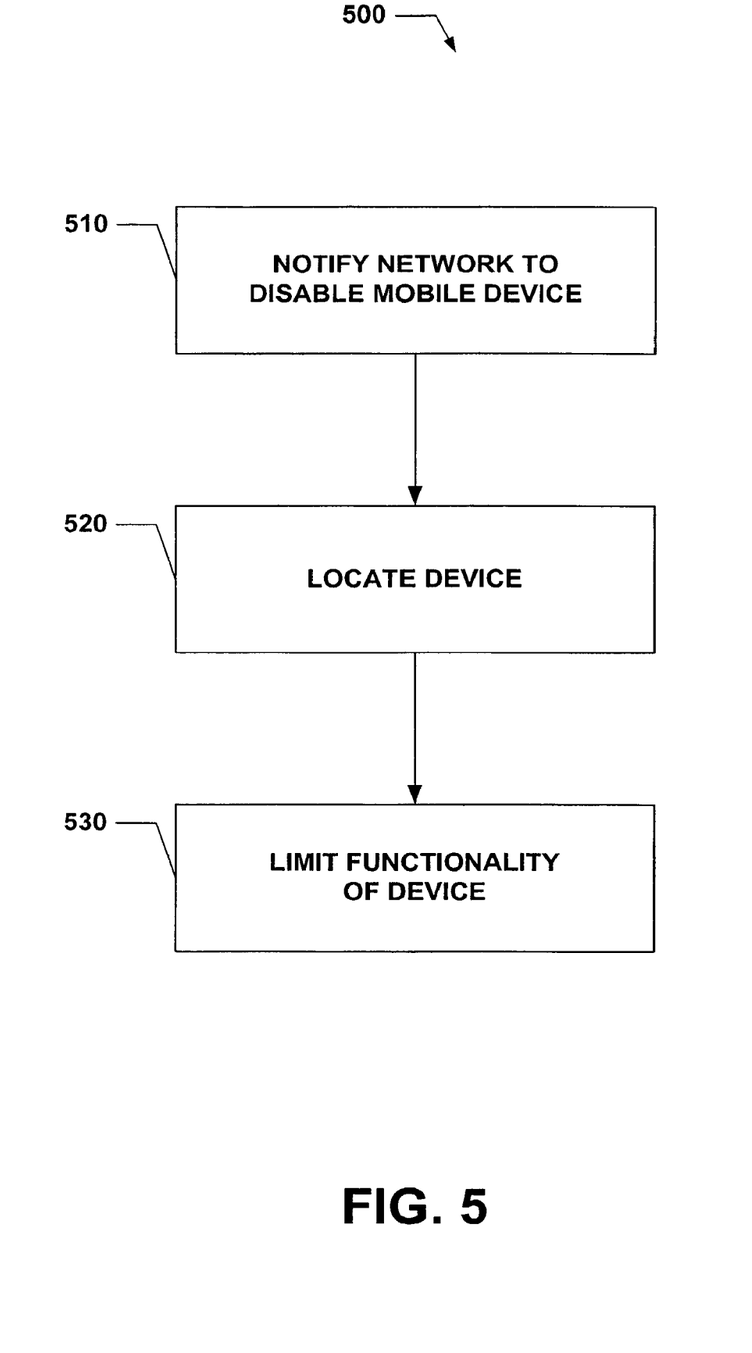
FIG. 5 illustrates an exemplary methodology that locates and limits the functionality of a mobile device, in accordance with an aspect of the present invention.
Figure 6:
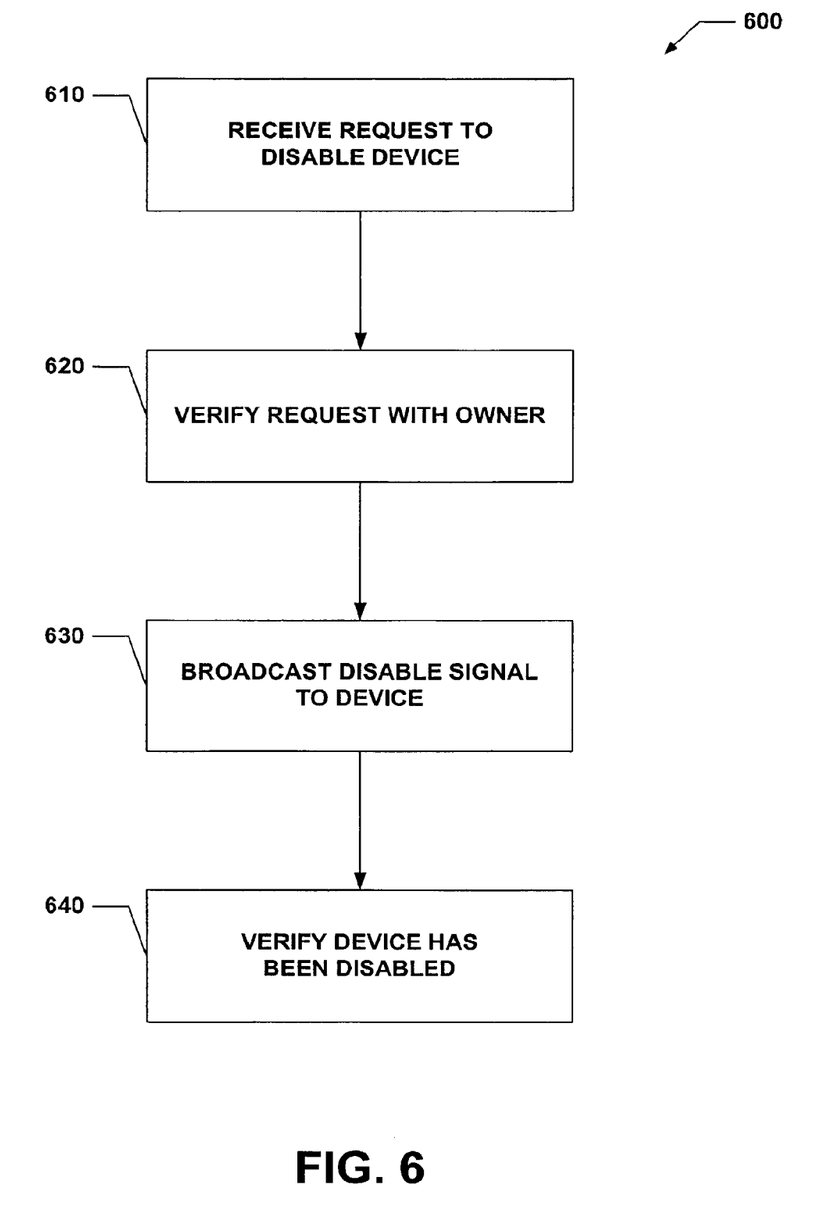
FIG. 6 illustrates an exemplary methodology that verifies a device has been disabled, in accordance with an aspect of the present invention.

FIGS. 4-6 illustrate document annotation methodologies 400, 500 and 600 in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

Referring initially to FIG. 4, a methodology 400 that facilitates disabling the functionality of a mobile device upon the reception of a disabling signal from an outside source. At reference numeral 410, a disabling signal is received from an outside source. In one aspect of the present invention, the signal can be sent via a network command control. Such a signal can be sent, for example, on a periodic basis or based on an event such as when the mobile device is lost or stolen. This signal can be broadcast throughout the wireless network employed by the mobile device. Alternatively, if the mobile device is outside the coverage area of the wireless network it typically employs, a third party carrier can broadcast the disable signal to insure communication with the device regardless of location.

At 420, data is extracted from the signal in order to determine if the signal contains information that relates to disabling and/or limiting the functionality of the device. For example, if the mobile device is a cellular phone and call is made to such a phone, the caller ID of the caller can be utilized to trigger the memory disabling component as mentioned above. In another example, the signal can be sent to the mobile device by way of the signaling protocol of the wireless network on which the device communicates (e.g., IS2000, CDMA, GSM, WCDMA, etc).

At 430, the functionality of the device is disabled based on the information received from the signal sent to the device. For example, if the signal relates to locking the keypad, the device keypad will lock upon reception of the signal. Alternatively or additionally, the data stored in the device memory can be transferred to another location via the wireless network. In this aspect of the current invention, once the disabling signal is received, it can contain a command to first upload desired data to a data store located on the network. Such a data store can be accessed from a plurality of disparate locations that communicate on the wireless network such as desktop computers, laptop computers, PDAs and the like.

Turning now to FIG. 5, a methodology 500 wherein the original device owner can access a lost or stolen device and subsequently limit the functionality of the device. Initially, at reference numeral 510, the original owner of the device can notify the network to disable the mobile device. The original owner can notify the network in a multitude of ways including a wireless network, the Internet or via computer, PDA or cell phone, for example. Further, a plurality of choices can be made available to the original device owner to select the type and duration of the functional limitation of the device. For example, the owner may wish to disable the screen, upload the information to a remote data store and then erase the memory. Thus, a single command can be utilized and upon completion, the network will no longer attempt to communicate with the device.

At 520, the device is located in order to ensure communication is successful with the device and/or to allow recovery of the device by the original owner. In one aspect of the present invention, a global positioning system (GPS) can be employed to provide the coordinates of the device. The GPS can function at all times or, alternatively, can function only for a desired duration of time (e.g., until the device is recovered). Choosing the type of method to locate the device can be related to the duration of time that has passed from when the device is lost or stolen to when the owner makes such a discovery. Also, choosing such a method can be related to the location (e.g., airport home, office, etc.) in which the device was lost or stolen. For example, an audio signal can be sounded to indicate the location of the device when the owner has recently lost the device. As another example, if the device has been misplaced at a residence, an audio alarm can be initiated even if the phone is off or the ringer is off.

In yet another aspect of the invention, the GPS function can be utilized when a device has been out of the possession of the owner for a substantial period of time. If the GPS locator is utilized, the device owner can track the location of the device via a network operator such as a network operator website. In this manner, the device and the data contained within the device can be recovered.

In another aspect of the invention, the device owner can notify the network their device has been lost or stolen, and such a device can be disabled upon an attempted use of the device. For example, when the current possessor (e.g., not the owner) of the device attempts to place a phone call, the network can be notified and the disabling signal can be sent to the device.

At 530, the device functionality can be limited by utilizing invasive or non-invasive techniques as noted above. Some invasive techniques are to erase the data from the memory of the device or to permanently disable the device itself. Some non-invasive techniques are to sound an audio alarm, lock the keypad of the device or to blank the screen of the device. It is to be appreciated that numerous techniques exist and that the disabling signal can be employed in association with substantially any desired technique.

Turning now to FIG. 6, an exemplary method 600 that sends a signal and verifies such signal has been received by the device. At 610, the network operator receives a request to disable a device that communicates with the network.

Such a request can be sent via phone, email, web application, disparate mobile device and the like. Further, the network operator can verify the request at 620 to insure an unscrupulous user (e.g., non-device owner) is not making the disabling request. Such verification can be made utilizing a user name and password or security question that relates to personal information (e.g., mother's maiden name, social security number, father's middle name etc), for example. Thus, by utilizing the subject invention, security measures can be implemented to insure the systems and methods are employed by authorized requestors.

At 630, a signal is broadcast to disable the device once it has been determined the user is authorized to make such a request. Such a disabling signal can be broadcast utilizing the wireless network to communicate with the device (e.g., cell phone network). Alternatively, a third party signal (e.g., satellite communication) can be employed to communicate with the device if the wireless communication is unsuccessful. Also, the signal can be sent one time, on a periodic basis or continuously until communication is successful, for example.

At reference numeral 640, the network operator can verify the device has been disabled. Such verification provides a robust, closed loop control to insure the broadcast signal successfully communicates with the device and that the device has been disabled. Such verification can be made via a signal sent back from the device (e.g., handshake, ACK/NACK or ping). The original device owner can subsequently be contacted via phone, email, etc. to provide them with such information. Further, the device owner can decide to take further action (e.g., delete the memory) if they have located the information elsewhere and no longer wish to maintain the data in the device memory. Thus, the level of disability to the device can be modified and/or changed as desired by the user.

Figure 7:
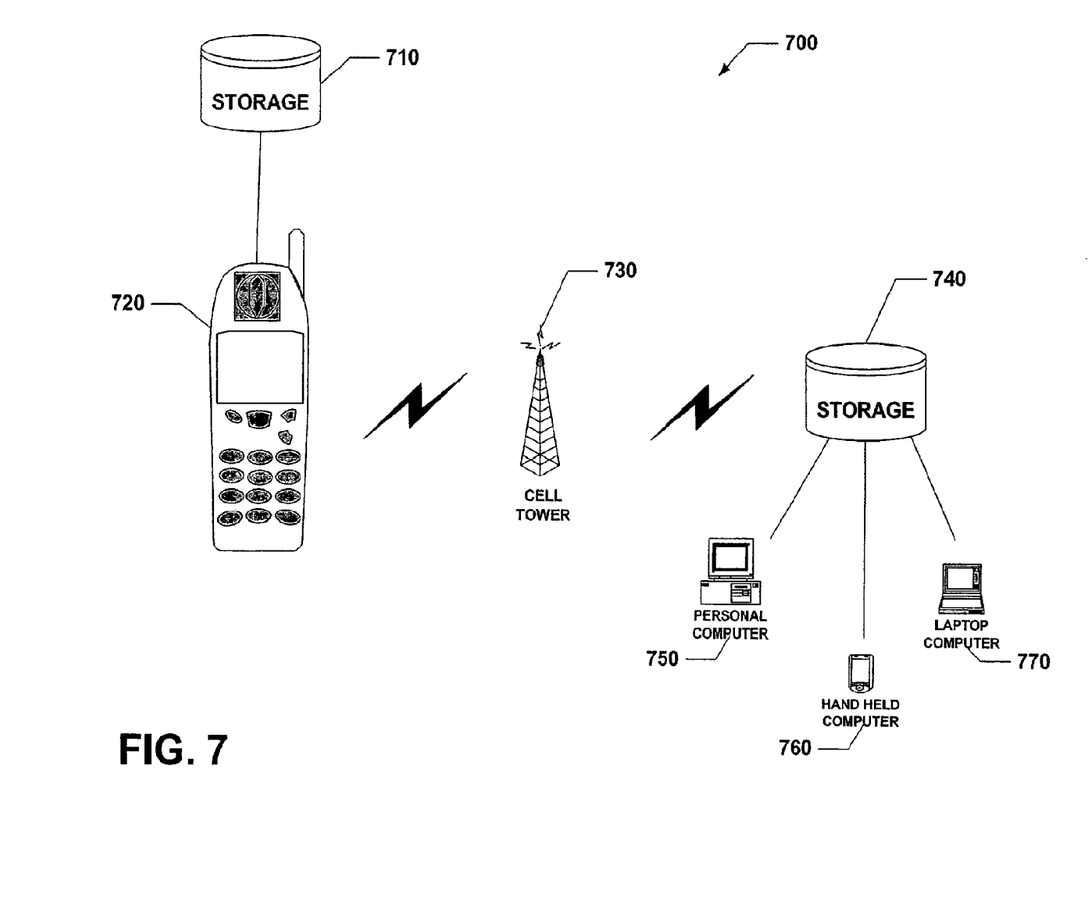
FIG. 7 illustrates an exemplary system that illustrates disparate data storage options, in accordance with an aspect of the present invention.

FIG. 7 illustrates an exemplary system 700 that stores and/or transmits data from a mobile device to a data store located locally and/or remotely in relation to the device. Local memory 710 can be employed to store data entered into the mobile device 720 and/or transmitted to the mobile device via wireless communication. In order to store data remotely, information can be transmitted utilizing a cell tower 730 to communicate with the remote data store 740. In turn, data located in the remote data store 740 can be accessed utilizing a personal computer 750, handheld computer 760, laptop computer 770, or any other device which communicates across the network, for example. Such local and remote data stores can be utilized concurrently (e.g., data is stored in both locations simultaneously), or independent of one another wherein the data is stored locally and/or remotely.

The device owner can manage his/her data in a number of ways. For example, data can be ranked in order of importance to the user. In one aspect of the present invention, the location the data is stored is dependent upon the importance ranking (unimportant, important, etc.) associated with the data. For example, data that is ranked as important can be stored remotely to insure easy and convenient recovery of such data. To further insure the data is secure, the remote storage can have a redundant data store, for example. Contrarily, data that is ranked as unimportant can be stored locally so that if data recovery is not possible, it is of no substantial loss to the device owner.

Figure 8:
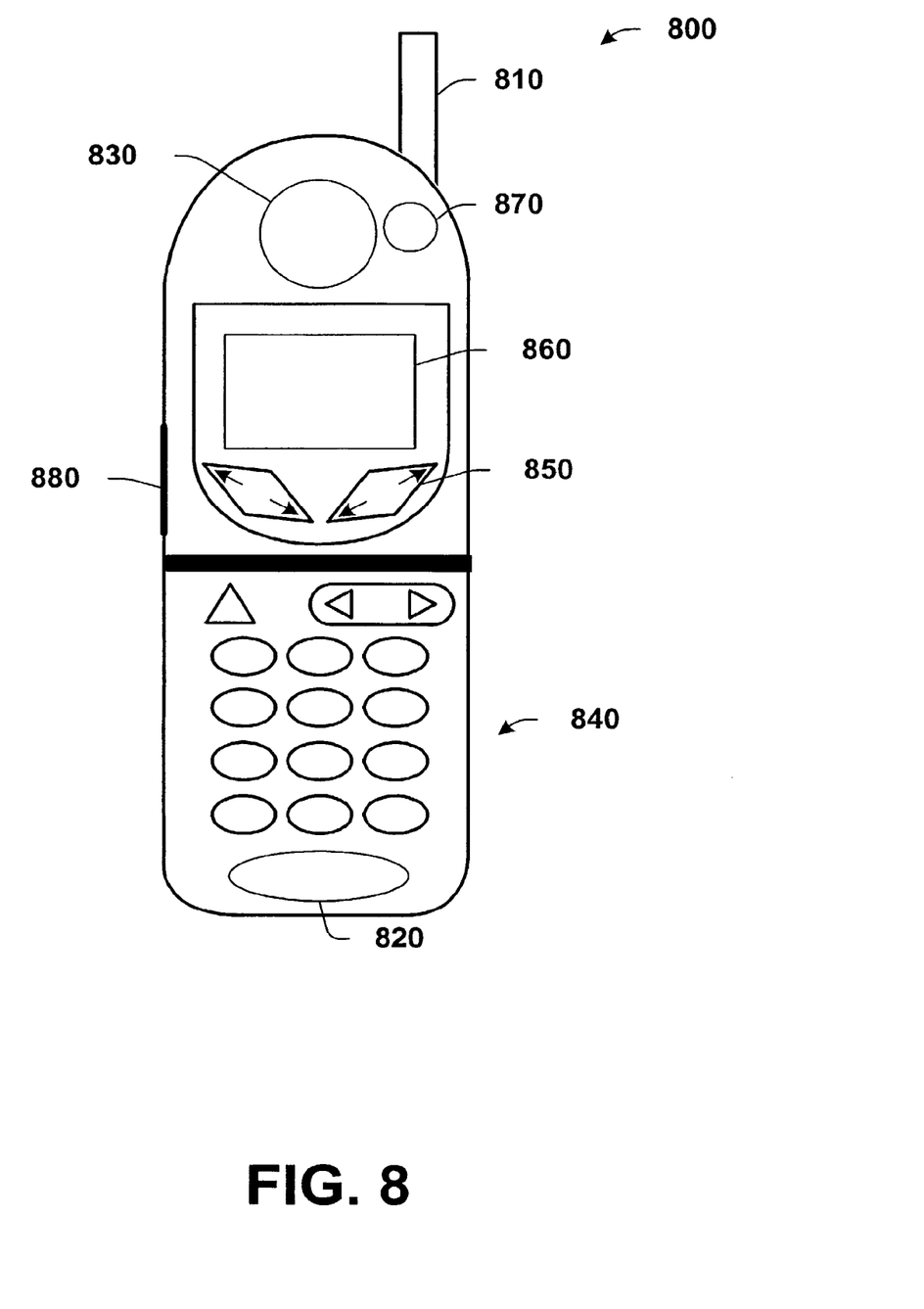
FIG. 8 illustrates an exemplary mobile device wherein the invention can be employed.

FIG. 8 illustrates an exemplary mobile (e.g., portable and wireless) telephone 800 that can employ the novel aspects of the present invention. The mobile telephone 800 comprises an antenna 810 that communicates (e.g., transmit and receive) radio frequency signals with one or more base stations. The antenna 810 can be coupled to duplexer circuitry (e.g., as described herein) within the mobile telephone 800. In addition, the mobile telephone 800 can include a separate signal-receiving component (not shown) that can also be coupled to the duplexer.

The mobile telephone 800 further comprises a microphone 820 that receives audio signals and conveys the signals to at least one on-board processor for audio signal processing, and an audio speaker 830 for outputting audio signals to a user, including processed voice signals of a caller and recipient music, alarms, and notification tones or beeps. Additionally, the mobile telephone 800 can include a power source such as a rechargeable battery (e.g., Alkaline, NiCAD, NiMH and Li-ion), which can provide power to substantially all onboard systems when the user is mobile.

The mobile telephone 800 can further include a plurality of multi-function buttons including a keypad 840, menu navigating buttons 850 and on-screen touch sensitive locations (not shown) to allow a user to provide information for dialing numbers, selecting options, navigating the Internet, enabling/disabling power, and navigating a software menu system including features in accordance with telephone configurations. A display 860 can be provided for displaying information to the user such as a dialed telephone number, caller telephone number (e.g., caller ID), notification information, web pages, electronic mail, and files such as documents, spreadsheets and videos. The display 860 can be a color or monochrome display (e.g., liquid crystal, CRT, LCD, LED and/or flat panel), and employed concurrently with audio information such as beeps, notifications and voice. Where the mobile telephone 800 is suitable for Internet communications, web page and electronic mail (e-mail) information can also be presented separately or in combination with the audio signals.

The menu navigating buttons 850 can further enable the user to interact with the display information. In support of such capabilities, the keypad 840 can provide keys that facilitate alphanumeric input, and are multifunctional such that the user can respond by inputting alphanumeric and special characters via the keypad 840 in accordance with e-mail or other forms of messaging communications. The keypad keys also allow the user to control at least other telephone features such as audio volume and display brightness.

An interface can be utilized for uploading and downloading information to memory, for example, the reacquisition time data to the telephone table memory, and other information of the telephone second memory (e.g., website information and content, caller history information, address book and telephone numbers, and music residing in the second memory). A power button 870 allows the user to turn the mobile telephone 800 power on or off.

The mobile telephone 800 can further include memory for storing information. The memory can include non-volatile memory and volatile memory, and can be permanent and/or removable. The mobile telephone 800 can further include a high-speed data interface 880 such as USB (Universal Serial Bus) and IEEE 1394 for communicating data with a computer. Such interfaces can be used for uploading and downloading information, for example website information and content, caller history information, address book and telephone numbers, and music residing in the second memory. In addition, the mobile telephone 900 can communicate with various input/output (I/O) devices such as a keyboard, a keypad, and a mouse.

In order to provide a context for the various aspects of the invention, FIGS. 15 and 16 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

Figure 9:
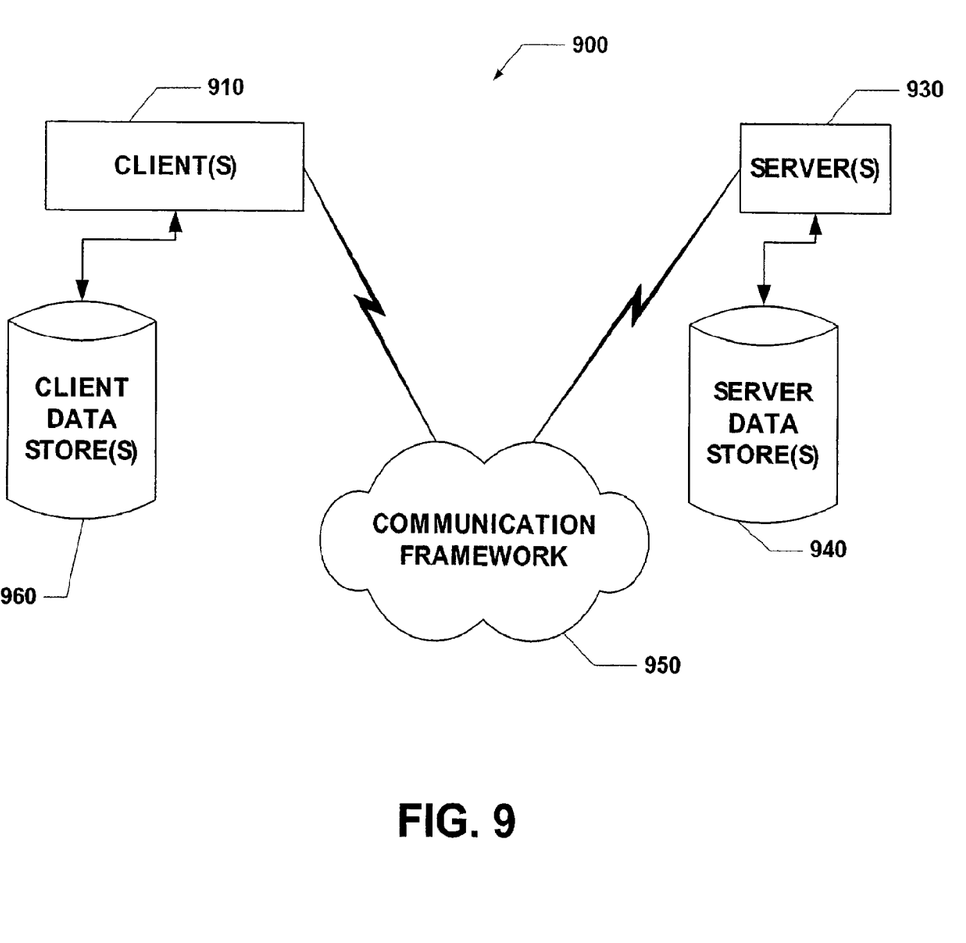
FIG. 9 illustrates an exemplary network wherein the invention can be employed.

FIG. 9 illustrates an exemplary computing environment 900 in which the present invention can be employed. The system 900 includes one or more client(s) 910. The client(s) 910 can be hardware and/or software (e.g., threads, processes, computing devices). The system 900 additionally includes one or more server(s) 930. Likewise, the server(s) 930 can be hardware and/or software (e.g., threads, processes, computing devices).

One possible communication between a client 910 and a server 930 can be in the form of a data packet transmitted between two or more computer processes. The system 900 further includes a communication framework 950 that can be employed to facilitate communications between the client(s) 910 and the server(s) 930. The client(s) 910 can interface with one or more client data store(s) 960, which can be employed to store information local to the client(s) 910. Similarly, the server(s) 900 can interface with one or more server data store(s) 940, which can be employed to store information local to the servers 930.

Figure 10:
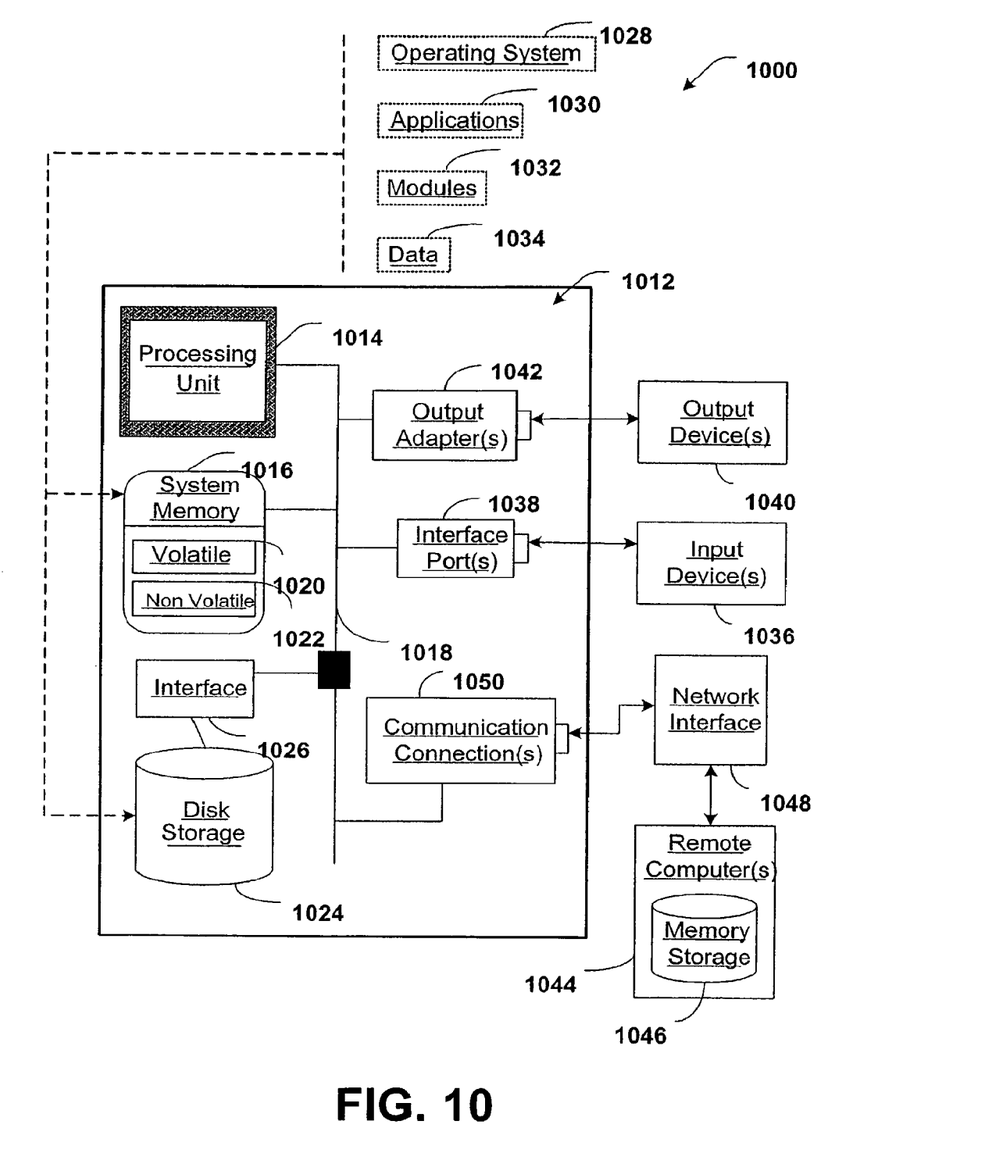
FIG. 10 illustrates an exemplary computing environment wherein the invention can be employed.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

What is claimed is:

1. An apparatus comprising:
   a memory storing computer program code;
   a processor operable to execute the computer program code to cause the apparatus to:
   receive a remotely originated request to disable the apparatus, the request comprising a customizable set of types and durations for one or more functional limitations, the customizable set based on a user input received at a second apparatus;
   extract information from the request;
   based on the extracted information, disable at least one functionality of the apparatus for a selected duration; and
   transmit a confirmation that the at least one functionality of the apparatus is disabled, wherein
   the disabling of at least one functionality of the apparatus comprises at least one of a screen blank-out and disabling access to memory of the apparatus.

2. The apparatus of claim 1, wherein the processor is further operable to cause the apparatus to activate a predetermined security feature in response to the request.

3. The apparatus of claim 2, wherein the security feature erases data stored in memory of the apparatus.

4. The apparatus of claim 1, wherein the request is received via a phone call and wherein processor is further operable to cause the apparatus to verify the request based at least in part on a caller identification associated with the phone call.

5. The apparatus of claim 1, wherein the request is received as at least one of a one-time transmission, a periodic transmission and a continuous transmission.

6. The apparatus of claim 1, wherein the processor is further operable to transmit the confirmation by transmitting the confirmation to a network operator.

7. The apparatus of claim 1, wherein the disabling of at least one functionality of the apparatus further comprises at least one of a keypad lock, a voice lock, and a deletion of memory of the apparatus.

8. The apparatus of claim 1, wherein the processor is further operable to cause the apparatus to activate a tracking function, the tracking function comprising one or more of a global positioning system, a homing beacon and an audio alarm.

9. The apparatus of claim 1, wherein the processor is further operable to cause the apparatus to perform remote storage of data stored on the memory.

10. A method comprising:
    receiving, at a mobile device, a remotely originated request to disable at least one functionality of the mobile device, the request comprising a customizable set of types and durations for one or more functional limitations, the customizable set based on a user input received at a second device;
    extracting information from the request;
    based on the extracted information, disabling at least one functionality of the mobile device for a selected duration; and
    transmitting a confirmation that the at least one functionality of the mobile device is disabled, wherein
    the extracted information comprises information configured to cause the mobile device to disable at least one functionality via an internal security feature of the mobile device, and
    the internal security feature comprises one or more of blanking a screen and disabling access to mobile device memory.

11. The method of claim 10, further comprising authenticating the request with a mobile device owner.

12. The method claim 10, wherein the internal security feature further comprises one or more of locking a keypad, locking a microphone, and deleting mobile device memory.

13. The method of claim 10, further comprising activating a tracking function, the tracking function comprising one or more of a global positioning system, a homing beacon and an audio alarm.

14. An apparatus comprising:
    a memory storing computer program code;
    a processor operable to execute the computer program code to cause the apparatus to:
    receive a remotely originated request to disable the apparatus, the request comprising a customizable set of types and durations for one or more functional limitations, the customizable set based on a user input received at a second apparatus; and extract information from the request, the extracted information triggering the apparatus to:

detect an attempt to use the apparatus;

in response to a detection of an attempt to use the apparatus, disable at least one functionality of the apparatus for a duration indicated in the request; and transmit a confirmation that the at least one functionality of the apparatus is disabled.

15. A method comprising:

receiving, at a mobile device, a remotely originated request to disable at least one functionality of the mobile device, the request comprising a customizable set of types and durations for one or more functional limitations, the customizable set based on a user input received at a second device;

extracting information from the request;

detecting an attempt to use the mobile device;

in response to a detection of an attempt to use the mobile device, disabling at least one functionality of the mobile device for a duration indicated in the request; and transmitting a confirmation that the at least one functionality of the mobile device is disabled.

* * * * *